(12) United States Patent
Huber et al.

(10) Patent No.: US 9,073,135 B2
(45) Date of Patent: *Jul. 7, 2015

(54) METHOD FOR SLICING WAFERS FROM A WORKPIECE

(75) Inventors: Anton Huber, Burghausen (DE); Wolfgang Gmach, Emmerting (DE); Robert Kreuzeder, Wurmannsquick (DE); Peter Wiesner, Reut (DE)

(73) Assignee: SILTRONIC AG, Munich (DE)

(*) Notice: Subject to any disclaimer, the term of this patent is extended or adjusted under 35 U.S.C. 154(b) by 446 days.

This patent is subject to a terminal disclaimer.

(21) Appl. No.: 13/423,350

(22) Filed: Mar. 19, 2012

(65) Prior Publication Data

US 2012/0240915 A1    Sep. 27, 2012

(30) Foreign Application Priority Data

Mar. 23, 2011  (DE) .......................... 10 2011 005 949

(51) Int. Cl.
| | |
|---|---|
| *B28D 5/00* | (2006.01) |
| *B28D 1/08* | (2006.01) |
| *B23D 57/00* | (2006.01) |
| *B28D 5/04* | (2006.01) |

(52) U.S. Cl.
CPC ............ *B23D 57/0053* (2013.01); *B28D 5/045* (2013.01); *B28D 5/0064* (2013.01); *B28D 5/0076* (2013.01)

(58) Field of Classification Search
CPC .... B28D 5/045; B28D 5/0076; B28D 5/0064; B28D 57/0053

USPC ........................ 125/16.01, 16.02, 21; 451/5, 7
IPC ................................................ B28D 1/08,5/00
See application file for complete search history.

(56) References Cited

U.S. PATENT DOCUMENTS

| | | | | |
|---|---|---|---|---|
| 5,377,568 A | * | 1/1995 | Hauser .............................. 83/74 |
| 5,616,065 A | * | 4/1997 | Egglhuber ...................... 451/10 |
| 5,778,869 A | * | 7/1998 | Toyama ..................... 125/16.02 |
| 6,050,254 A | * | 4/2000 | Egglhuber ................. 125/16.02 |
| 6,178,961 B1 | * | 1/2001 | Nagatsuka et al. ............. 125/21 |
| 6,390,896 B1 | * | 5/2002 | Huber et al. ..................... 451/59 |
| 6,652,356 B1 | * | 11/2003 | Ariga ................................ 451/7 |
| 7,766,724 B2 | * | 8/2010 | Huber et al. ....................... 451/5 |
| 2002/0174861 A1 | * | 11/2002 | Lundt et al. ..................... 125/21 |
| 2007/0178807 A1 | * | 8/2007 | Gupta et al. ...................... 451/5 |
| 2008/0011134 A1 | * | 1/2008 | Wiesner ........................... 83/31 |

(Continued)

FOREIGN PATENT DOCUMENTS

| | | | | |
|---|---|---|---|---|
| DE | 69629247 T2 | 1/2004 | | |
| EP | 1004383 A1 | * 5/2000 | ............. B23D 57/00 |

(Continued)

*Primary Examiner* — Joseph J Hail
*Assistant Examiner* — Marc Carlson
(74) *Attorney, Agent, or Firm* — Leydig, Voit & Mayer, Ltd.

(57) ABSTRACT

A method for slicing wafers from a workpiece includes providing wire guide rolls that each have a grooved coating with a specific thickness, providing a fixed bearing respectively associated with each wire guide roll and providing a sawing wire including wire sections disposed in a parallel fashion. The wire sections are tensioned between the wire guide rolls and are moved relative to the workpiece so as to perform a sawing operation. The wire guide rolls cooled and the fixed bearings are cooled independently of the wire guide rolls.

8 Claims, 5 Drawing Sheets

(56) References Cited

U.S. PATENT DOCUMENTS

2008/0264228 A1* 10/2008 Huber et al. .................... 83/764
2010/0089377 A1* 4/2010 Oishi et al. ................. 125/16.02
2010/0258103 A1* 10/2010 Kitagawa ........................ 125/21
2011/0088678 A1* 4/2011 Kitagawa ................... 125/16.01
2012/0178346 A1* 7/2012 Wiesner et al. ................ 451/54
2012/0240914 A1* 9/2012 Huber et al. .................... 125/21

FOREIGN PATENT DOCUMENTS

| JP | 08267446 A | | 10/1996 | |
| JP | 11058365 A | | 2/1999 | |
| JP | 2001334451 A | | 12/2001 | |
| JP | 2002086339 A | | 3/2002 | |
| JP | 2003145406 A | * | 5/2003 | .............. B24B 27/06 |

* cited by examiner

METHOD FOR SLICING WAFERS FROM A WORKPIECE

CROSS REFERENCE TO RELATED APPLICATIONS

This application claims priority to German Patent Application No. DE 10 2011 005 949.0 filed Mar. 23, 2011, which is hereby incorporated by reference herein in its entirety.

FIELD

The invention relates to a method for slicing wafers from a workpiece, in which during a sawing operation wire sections—arranged in a parallel fashion—of a sawing wire are guided relative to the workpiece, thus giving rise to the wafers.

BACKGROUND

A method for slicing wafers can be carried out using a wire saw. The basic construction and the functioning of a wire saw are described, for example, in US 2002/0174861 A1 or US 2010/0089377. A suitable wire saw accordingly comprises at least two wire guide rolls around which a sawing wire is wound multiply. This gives rise to wire sections which are tensioned between two wire guide rolls and arranged in a parallel fashion and which form a wire web through which the workpiece is moved during the sawing operation. Wire sawing methods in which, instead, the wire web is moved through the workpiece are also known.

Appropriate workpieces include materials which are separated into wafers, in particular blocks composed of semiconductor material, from which semiconductor wafers are sliced.

The wire guide rolls have a coating having a specific thickness and having grooves that guide the wire sections. The region of the surface of the coating wears with the duration of the loading by the sawing operation. As long as the coating is still thick enough, the worn region of the surface of the coating can be removed by being ground away and the thinner coating regenerated in this way can continue to be used.

The sawing wire is wound from a supply spool onto a receiver spool during the sawing operation. In this case, the running direction of the sawing wire is usually changed cyclically, as a result of which more comprehensive utilization of the sawing wire is achieved.

Slicing the wafers uses abrasive grain that removes material from the workpiece in a cutting mode of operation. The abrasive grain can be fixedly bonded to the sawing wire. More often, use is instead made of a sawing slurry in which the abrasive grain is dispersed and which is fed to the wire web.

Semiconductor wafers which are produced in this way should have side surfaces that are as flat and plane-parallel as possible. In order that wafers having such a geometrical characteristic can arise, an axial relative movement between the workpiece and the wire sections, that is to say a relative movement parallel to the central axis of the workpiece, should be avoided during the sawing operation. If such a relative movement nevertheless takes place, wafers having a curved cross section arise. The degree of bending of the wafers is often specified by a characteristic value called warp.

As a cause of the occurrence the abovementioned relative movement, changes in the length of the workpiece and of the wire guide rolls are mentioned in US 2010/0089377 A1, said changes being attributed to changes in temperature and an associated thermal expansion or thermal contraction. In actual fact, frictional heat is generated particularly during the movement of the sawing wire around the wire guide rolls and when the sawing wire engages into the workpiece, and, in particular, the temperature of the workpiece, of the wire guide rolls and of the bearings of the wire guide rolls is changed as a result of heat transport.

US 2002/0174861 A1 describes a method which provides for regulating the temperature of the workpiece during the sawing operation.

US 2010/0089377 A1 proposes a method in which the displacement of the workpiece in an axial direction is measured and the axial displacement of the wire guide rolls is regulated in such a way that it corresponds to that measured. The regulation of the axial displacement of the wire guide rolls is effected, according to one example, by cooling water being conducted through the shafts of the wire guide rolls and by adaptation of the temperature and/or flow rate of the cooling water. Furthermore, it is proposed to record a curve showing the displacement of the workpiece as a function of the cutting depth, and to regulate the displacement of the wire guide rolls on the basis of the curve.

SUMMARY

In an embodiment, the present invention provides a method for slicing wafers from a workpiece that includes providing wire guide rolls that each have a grooved coating with a specific thickness, providing a fixed bearing respectively associated with each wire guide roll and providing a sawing wire including wire sections disposed in a parallel fashion. The wire sections are tensioned between the wire guide rolls and are moved relative to the workpiece so as to perform a sawing operation. The wire guide rolls cooled and the fixed bearings are cooled independently of the wire guide rolls.

BRIEF DESCRIPTION OF THE DRAWINGS

Exemplary embodiments of the present invention are described in more detail below with reference to the drawings, in which.

DETAILED DESCRIPTION

Figure 1:
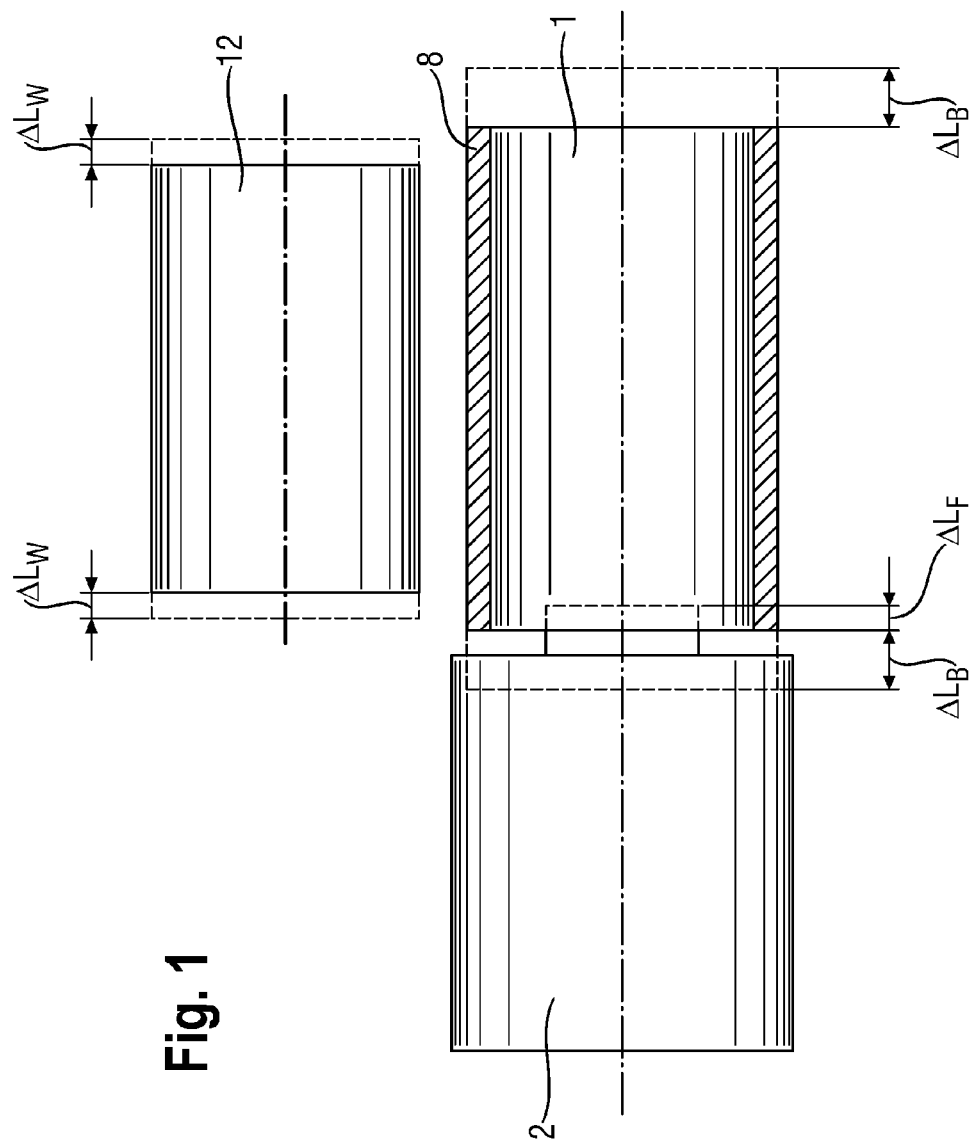
FIG. 1 schematically shows the changes in length that are crucially responsible for the fact that an axial relative movement between the workpiece and the wire sections can occur.

The inventors of the present invention have ascertained that, over and above the solutions offered by the prior art, there is a need for improvements in order to reduce or prevent an axial relative movement of the wire sections and of the workpiece that is caused by changes in temperature.

In an embodiment, the present invention provides a method for slicing wafers from a workpiece, comprising during a sawing operation moving wire sections—arranged in a parallel fashion—of a sawing wire relative to the workpiece, thus giving rise to the wafers, wherein the wire sections are tensioned between wire guide rolls each having a grooved coating having a specific thickness; and cooling the wire guide rolls and cooling the fixed bearings of the wire guide rolls, wherein the wire guide rolls and the fixed bearings are cooled independently of one another.

The wire guide rolls and the fixed bearings thereof are cooled independently of one another in order to reduce or completely prevent an axial relative movement of the workpiece and of the wire sections during the sawing operation. For this purpose, dedicated cooling circuits are in each case set up, through which coolant is in each case conducted, the properties of which are coordinated with the cooling of the wire guide rolls and of the fixed bearings, respectively.

In contrast to other solutions, embodiments of the present invention take account of the fact that the axial relative movement is substantially to be attributed to changes in the temperature of the workpiece, of the respective fixed bearing and of the coating of the respective wire guide roll. They take account of the fact, in particular, that the changes in the length of the coating and of the fixed bearing of the respective wire guide roll that are brought about by changes in temperature are different and, from this insight, provide the conclusion that it is more advantageous if the temperature of the respective wire guide roll, in particular the temperature of its coating, and the temperature of the fixed bearing of the respective wire guide roll are controlled in a manner independent of one another.

The change in the length of the workpiece during the sawing operation is dependent on the length of the workpiece before the sawing operation, and on the amount of heat that arises during the sawing operation. The latter is dependent on the process conditions chosen, which are described by a totality of different process parameters. These process parameters include, in particular, the speed of the sawing wire, the amount and temperature of the sawing slurry fed to the wire web, the advancing speed at which the workpiece is moved through the wire web, the type of abrasive grain and the type of liquid phase of the sawing slurry with which the workpiece is held. If the process conditions chosen remain unchanged over a plurality of sawing operations, the change in the length of the workpiece during one of the sawing operations is dependent only on the length of the workpiece before the sawing operation.

For sawing operations which proceed under the same process conditions, therefore, it suffices once to separate a workpiece into wafers under the process conditions chosen and to measure the temperature of the workpiece during the sawing operation. Afterward, for this sawing operation and for all other sawing operations which are intended to proceed under the process conditions chosen and by means of which material of the same type is intended to be cut, it is possible to create a curve that predicts the change in the length of a workpiece as a function of the cutting depth or the duration of the sawing operation. The change in length can be calculated with the aid of the coefficient of linear expansion of the material of the workpiece, the measured temperature profile and the length of the workpiece before the respective sawing operation.

The process of cooling the respective wire guide roll and the respective fixed bearing is preferably effected in such a way that at every point in time in the sawing operation the difference $\Delta L_W(x)-(\Delta L_F+\Delta L_B(x))$ is less than 20 µm, wherein $\Delta L_W(x)$ is the axial displacement experienced by an axial position x on the workpiece on account of a change in the length of the workpiece that is caused by the change in the temperature of the workpiece, $\Delta L_F$ is the change in length experienced by the respective fixed bearing as a result of the change in the temperature of the fixed bearing, and $\Delta L_B(x)$ is the axial displacement experienced by the axial position x on the coating of the wire guide roll on account of a change in the length of the coating that is caused by the change in the temperature of the coating. The axial position x is a position on the central axis of the workpiece or an equivalent position.

The greater the difference, the further away the wire sections are from a position that would ensure a straight cut through the workpiece. Moreover, without countermeasures, the difference becomes all the greater, the greater the distance between the axial position x and the center of the wire guide roll. That should be taken into account particularly when a plurality of workpieces are arranged alongside one another in order to saw them simultaneously. Such an arrangement of workpieces is implemented in order that the available wire web can be utilized as completely as possible.

In accordance with a first embodiment, the method according to the invention provides for controlling the temperature of the coating and the temperature of the fixed bearing of the respective wire guide roll in such a way that the reaction to a change in the length of the workpiece during the sawing operation comprises equidirectional changes in the length of the coating and of the fixed bearing.

Accordingly, the reaction to an axial displacement $\Delta L_W(x)$ comprises cooling the respective wire guide roll and the respective fixed bearing preferably in such a way that the difference $\Delta L_W(x)-(\Delta L_F+\Delta L_B(x))$ is less than 20 µm.

The control can be effected by providing a first predefinition curve, which describes the temperature or the speed of a coolant for cooling the respective wire guide roll during the sawing operation, by providing a second predefinition curve, which describes the temperature or the speed of a coolant for cooling the respective fixed bearing during the sawing operation, and by cooling the respective wire guide roll and the respective fixed bearing by means of the respective coolant in accordance with the first and second predefinition curves.

Providing the first predefinition curve as a function of the thickness of the coating of the respective wire guide roll is particularly preferred.

The control can also be effected by measuring an axial change in the length of the coating of the respective wire guide roll during the sawing operation, by generating a first and second regulation signal on the basis of the measurement, and by regulating the cooling of the respective wire guide roll by means of the first regulation signal and regulating the cooling of the respective fixed bearing by means of the second regulation signal.

In accordance with a second embodiment, the method according to the invention provides the following: cooling the workpiece in such a way that $\Delta L_W(x)$ is less than 5 µm during the sawing operation; and cooling the respective wire guide roll and the respective fixed bearing in such a way that the sum $(\Delta L_F+\Delta L_B(x))$ is less than 25 µm during the sawing operation, preferably less than 10 µm.

This embodiment aims as far as possible to avoid linear expansions of the workpiece and of the coating and of the fixed bearing of the respective wire guide roll. Therefore, it is particularly advantageous to completely suppress changes in temperature and associated changes in length of the workpiece and of the fixed bearing and of the coating of the respective wire guide roll during the sawing operation.

Avoiding linear expansions of the workpiece and of the coating and of the fixed bearing of the respective wire guide roll is particularly advantageous if a plurality of workpieces arranged alongside one another are to be sawn simultaneously. The length of the workpieces and the arrangement thereof relative to the center of the wire guide roll then have no influence on whether or not wafers having the desired geometry arise.

The method according to embodiments of the invention is preferably used to produce wafers having side surfaces that are as plane-parallel as possible. However, this also does not rule out modifying the aim of the method and producing wafers having a specific intended bending. In this case, the change in the length of the workpiece is compensated for by a change in the length of the fixed bearing and of the coating of the respective wire guide roll only to the extent necessary to achieve the intended bending.

The workpiece is typically held during the sawing operation in such a way that it can axially expand or contract in the event of a change in temperature at both ends. It consists, for example, of polycrystalline or monocrystalline semiconductor material, in particular of silicon. It typically has the form of a cylindrical rod portion having a diameter that suffices in order to be able to produce wafers having a diameter in the range of 200 to 450 mm.

A single crystal composed of silicon which is separated to form semiconductor wafers having a diameter of 300 mm experiences, during the sawing operation, a maximum change in temperature of an order of magnitude of typically 30° C., which corresponds to a maximum change in length of an order of magnitude of typically 25 µm. The specified orders of magnitude are typical of methods in which the single crystal is not cooled.

The change in the length of the coating of the wire guide roll during the sawing operation on account of a change in the temperature of the coating is dependent, in particular, on the coefficient of linear expansion of the material of the coating, on the thickness of the coating and on the amount of heat that arises during the sawing operation. The latter is crucially influenced by the process conditions and the length of the workpiece before the sawing operation. For sawing operations which are carried out under the same process conditions and with coating material of the same type, the change in the length of the coating is only dependent on the length of the workpiece and on the thickness of the coating.

The coating is typically fixed on the core of the wire guide rolls in such a way that it can axially expand or contract in the event of a temperature change in an unimpeded manner at both ends. However, the change in the length of the coating can be restricted within certain limits by virtue of the coating being clamped onto the underlying core of the wire guide roll, for example by clamping rings arranged at both ends of the coating. The clamping rings fix the coating on the core of the wire guide roll and restrict a change in the length of the coating that is caused by a change in temperature. Clamping the coating onto the core of the wire guide roll is appropriate particularly when the intention is to proceed in accordance with the second embodiment of the invention.

The measurement of the change in length experienced by the coating during the sawing operation is not simple. An optical measurement on the coating is not appropriate owing to the presence of the sawing slurry. The method according to the invention prefers measurement with the aid of eddy current sensors. For this purpose, it is advantageous to fix rings to the coating, to be precise to the ends thereof, and to measure the change in the distance between the respective ring and the respective sensor. The rings preferably consist of an electrically conductive material, for example a metal or graphite. In general, it suffices to measure the change in the length of the coating of one of the wire guide rolls and to assume that the change in the length of the coating of the other wire guide roll is the same. However, it is likewise possible to perform corresponding measurements of changes in the length of the coating on both wire guide rolls of the wire web.

Given a typical thickness of the coating of 6 mm, a coating composed of polyurethane experiences, during the process of slicing the wafers from the abovementioned single crystal composed of silicon without taking account of cooling measures and without taking account of the clamping of the coating on the core of the wire guide roll, a maximum change in temperature of an order of magnitude of typically 20° C. and a maximum linear expansion of an order of magnitude of typically 80 µm. Accordingly, the coating is subjected to a significantly greater change in length than the single crystal.

The wire guide rolls clamping the wire web are typically mounted in each case by means of a shaft in a fixed bearing and a movable bearing. In the event of a change in temperature, the fixed bearing cannot axially expand or contract at both ends, but rather only at the end lying opposite the movable bearing. A change in the length of the fixed bearing displaces the coating of the wire guide roll and thus each of the wire sections by a uniform magnitude.

In the case of a typical configuration of the fixed bearing, the fixed bearing experiences, during the process of slicing the wafers from the abovementioned single crystal composed of silicon without taking account of cooling measures, a maximum change in temperature of an order of magnitude of typically 1.5° C. and a maximum linear expansion of an order of magnitude of typically 6 µm.

The change in the length of the fixed hearing that is initiated by a change in temperature in the course of a sawing operation affects the position of the wire sections in a fundamentally different manner than a change in the length of the coating that is initiated by a change in temperature. The former displaces each of the wire sections by a uniform magnitude, while in the case of the latter the magnitude of the displacement is dependent on the distance between a wire section and the center of the wire guide roll. The displacement is all the greater, the greater the distance.

The control of the temperature of the fixed bearing and the temperature of the coating of the respective wire guide roll by cooling the fixed bearing or the wire guide roll disregards this fundamental difference and is therefore disadvantageous. It cannot change the temperature of the fixed bearing without simultaneously influencing the temperature of the coating of the wire guide roll. Such control cannot achieve what the method according to the invention achieves, namely the control of the temperature of the fixed bearing and the temperature of the coating of the respective wire guide roll in a manner independent of one another.

In accordance with the first embodiment of the method, the reaction to a change in the length of the workpiece during a sawing operation under specific process conditions comprises supplying independent cooling circuits with coolant, which is coordinated with respect to bringing about changes in length in the case of the fixed bearing and the coating of the wire guide roll, the sum of which corresponds as far as possible to the change in the length of the workpiece.

The coordination is done empirically, for example, by determining suitable cooling parameters in series of experiments. This involves determining what temporal profile of the temperature and/or speed of the coolant during the sawing operation is necessary in order to achieve required changes in the length of the fixed bearing and of the coating of the respective wire guide roll. The determined temporal profile of the cooling parameters is then stored in the form of predefinition curves in the data memory of a computer that controls the cooling circuits. If a workpiece with the same length and under the same process conditions is to be divided into wafers, the cooling circuits are controlled with regard to the coolant temperature and/or the coolant flow rate in accordance with the stored predefinition curves.

Since the change in the length of the coating on account of a change in temperature is crucially dependent on the thickness of the coating of the wire guide roll and on the length of the workpiece before the sawing operation, it is recommended, for each sawing operation carried out under specific process conditions, to store data sets with cooling parameters which take account of the thickness of the employed coating of the wire guide roll and the length of the workpiece to be divided.

The coordination can also be effected by setting up a control loop that supplies cooling circuits in the respective fixed bearing and in the respective wire guide roll with coolant. The control loop comprises sensors that are used to check during the sawing operation whether a deviation of the position of the wire sections from a desired position is present. When a deviation is present, cooling parameters of the cooling circuits such as the temperature and/or the speed of the coolant are changed until the deviation no longer exists.

FIG. 1 is a schematic sectional illustration through the workpiece 12, the wire guide roll 1 and the fixed bearing 2. The illustration shows the changes in length that are crucially responsible for the fact that an axial relative movement between the workpiece and the wire sections can occur. These include the change in length $\Delta L_W$ of the workpiece, the change in length $\Delta L_B$ of the coating of the wire guide roll and the change in length $\Delta L_F$ of the fixed bearing. For the sake of simplicity, the changes in length $\Delta L_B$ and $\Delta L_W$ are illustrated as if the fixed bearing and the wire guide roll were not connected to one another. Accordingly, a point with an axial position at the ends of the workpiece is displaced by the magnitude $\Delta L_W$ on account of thermal expansion of the workpiece, and a point with an axial position at the ends of the coating of the wire guide roll is displaced by the magnitude $\Delta L_B$ on account of thermal expansion of the coating.

Figure 2:
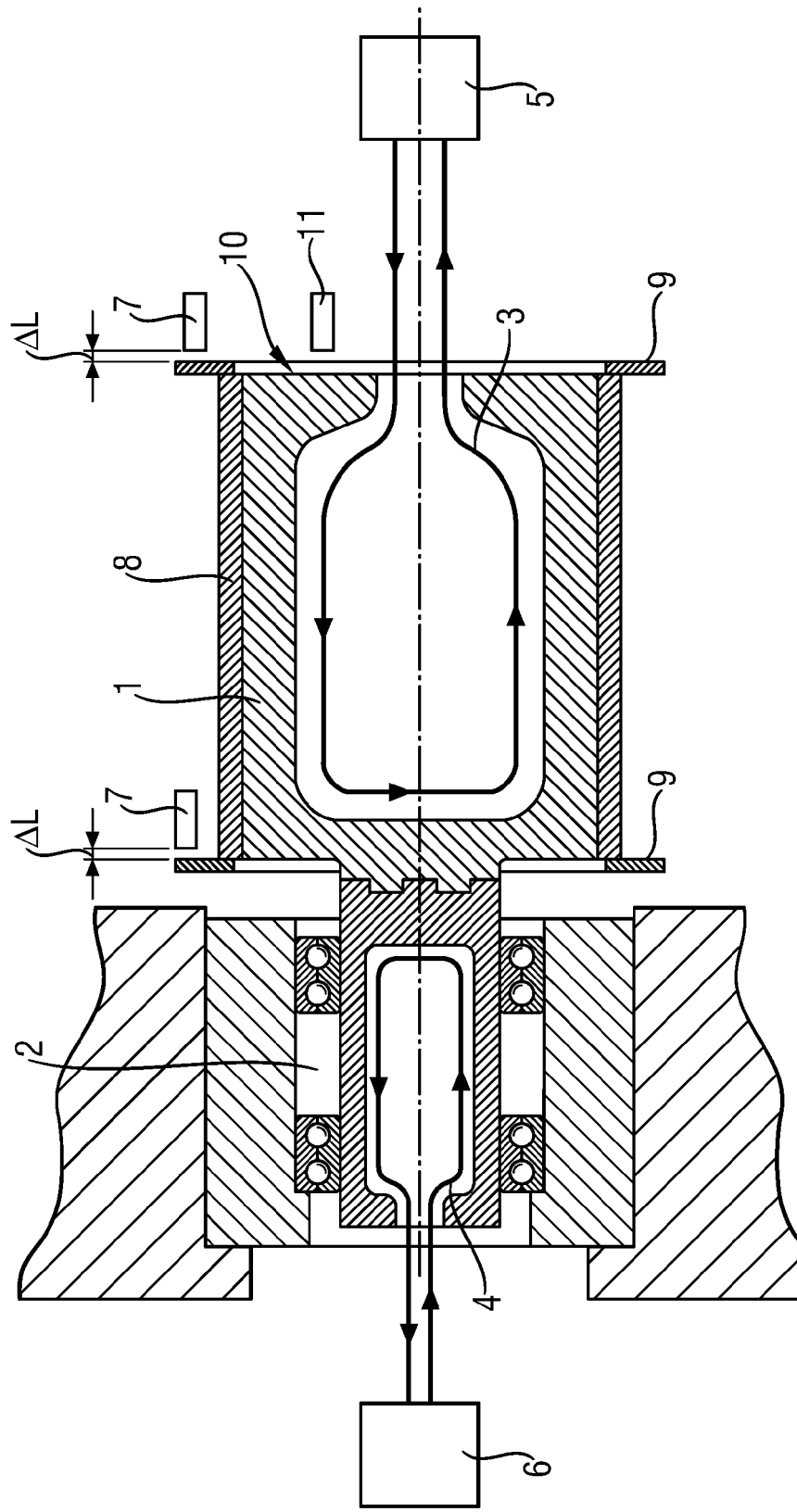
FIG. 2 shows in cross section a wire guide roll suitable for use a method according to an embodiment of the invention, and the fixed bearing associated with said wire guide roll.

The illustration in accordance with FIG. 2 shows that the wire guide roll 1 and the fixed bearing 2 associated therewith respectively have channels 3 and 4 connected to cooling circuits that are supplied with coolant independently of one another. The cooling circuit of the wire guide roll 1 is embodied in such a way that a coolant such as water, for example, is conducted through rotary leadthroughs into the wire guide roll 1 that rotates during the sawing operation. The cooling circuits each comprise heat exchangers and control units 5 and 6, which can be embodied for controlling cooling parameters for cooling the wire guide roll and the fixed bearing in accordance with stored predefinition curves.

However, the cooling circuits can also be incorporated with sensors 7 in two control loops that operate independently of one another for cooling the wire guide roll and the fixed bearing. The sensors then supply measurement signals from which, in the control units, cooling parameters are generated as manipulated variables for cooling the respective wire guide roll and the respective fixed bearing.

The sensors 7 preferably measure the distance from respectively assigned metal rings 9 arranged at the ends of the coating 8 of the wire guide roll 1. Since the coating 8 of the wire guide roll 1 expands or contracts to a comparatively great extent on account of a change in the temperature of the wire guide roll, it is advantageous to fix the metal rings 9 to the coating 8 itself. In the case of the metal rings being fixed to the core 10 of the wire guide roll, the change in the length of the coating 8 would be disregarded during the measurement. If it is desired to take account of the change in the length of the core of the wire guide roll, a further sensor 11 can be provided, which measures the distance from the core 10 of the wire guide roll. The core 10 of the wire guide roll 1 is usually produced from Invar, such that its influence on the change in the axial position of the wire sections is correspondingly small.

Figure 3:
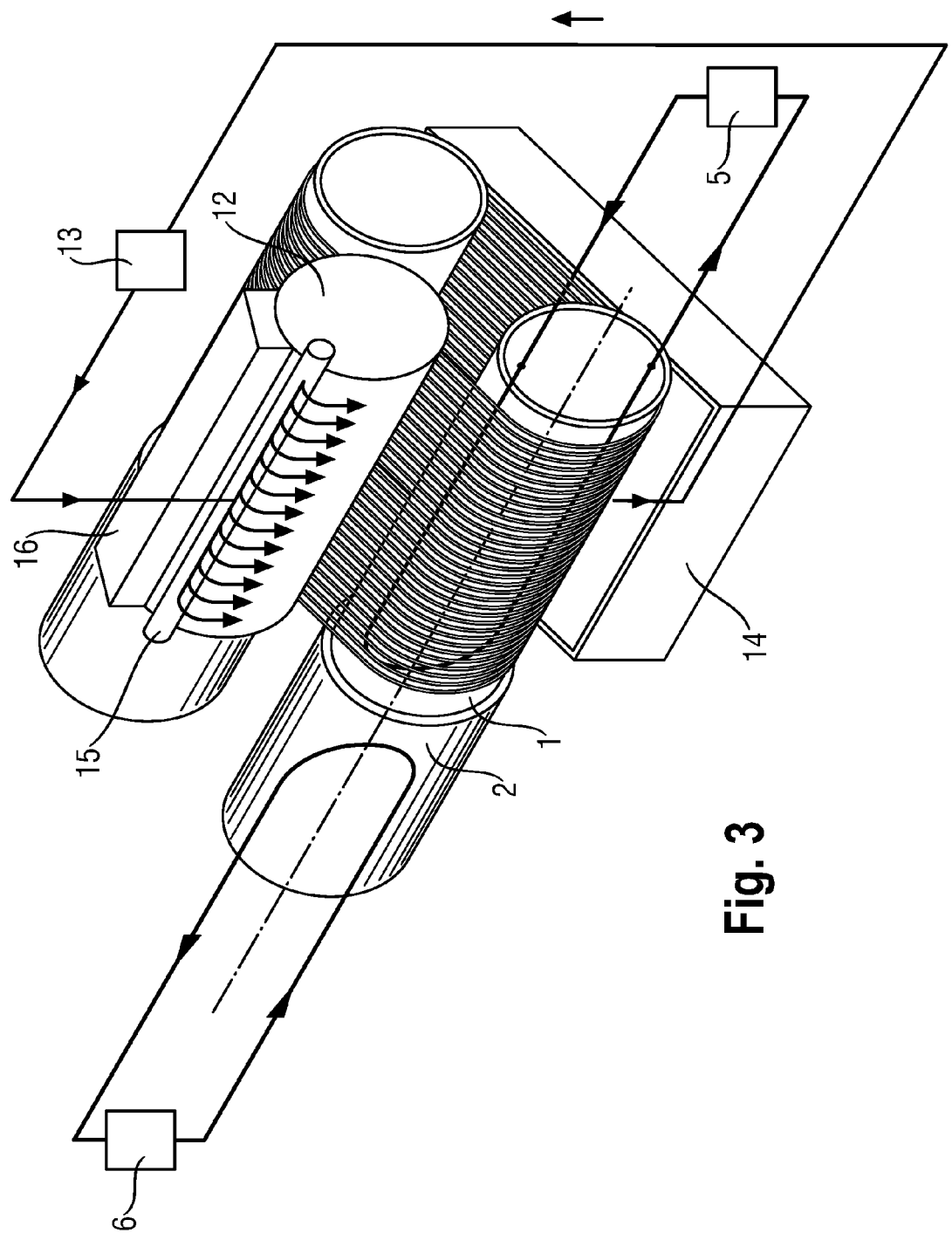
FIG. 3 shows in perspective view a wire saw having two wire guide rolls and a workpiece arranged above the wire saw.

FIG. 3 shows, in perspective view, a wire saw having two wire guide rolls 1 and a workpiece 12, which is fixed to a sawing strip 16 and is arranged above the wire saw. The wire saw is configured for being able to carry out the method in accordance with the second embodiment of the invention. The wire guide rolls 1 and the fixed bearings 2 respectively assigned to them are embodied in accordance with the illustration as shown in FIG. 2. The cooling circuits for cooling the second wire guide roll and its fixed bearing are not illustrated, for the sake of better clarity. The cooling circuits for cooling the wire guide rolls can be combined to form one cooling circuit or be embodied independently of one another. The cooling circuits for cooling the fixed bearings of the wire guide rolls can likewise be combined to form one cooling circuit or be embodied independently of one another.

The illustration also shows a further cooling circuit for cooling the workpiece 12. This cooling circuit comprises a heat exchanger and a control unit 13 which can be embodied for controlling cooling parameters for cooling the workpiece in accordance with a stored predefinition curve. The coolant for cooling the workpiece is distributed by means of a nozzle strip 15 and drops from the workpiece 12 into a trough 14.

However, the cooling circuit can also be incorporated with a further sensor into a control loop for cooling the workpiece. The sensor then supplies measurement signals from which, in the control unit, cooling parameters are generated as manipulated variables for cooling the workpiece. The sensor measures, for example, the distance from the end side of the workpiece. The same sawing slurry that is also used for slicing the wafers can be used for cooling the workpiece. However, it is preferred to use, for cooling the workpiece, a coolant such as water, for example, which has only the cooling function, and to prevent this coolant from mixing with the sawing slurry. For this purpose, the coolant can be intercepted by wipers applied to the workpiece before said coolant reaches the wire web and the sawing slurry.

EXAMPLE

Single crystals composed of silicon having a diameter of 300 mm were separated into wafers by means of a wire saw comprising four wire guide rolls. The wire guide rolls clamping the wire web and their associated fixed bearings had the structure shown in FIGS. 2 and 3 and were cooled according to the invention. The cooling of said wire guide rolls and their fixed bearings was effected in a mutually independent manner by means of water as coolant, the temperature of which was changed during the sawing operation in accordance with stored predefinition curves.

Figure 4:
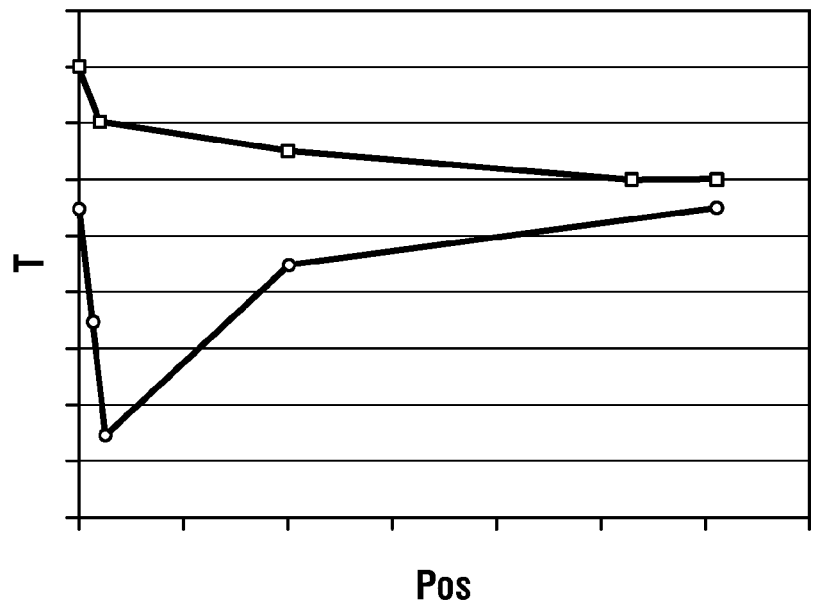
FIG. 4 shows predefinition curves that were used for cooling wire guide rolls and the fixed bearings thereof in a method in accordance with an embodiment.

FIG. 4 shows the predefinition curves that were used for cooling the wire guide rolls clamping the wire web and the fixed bearings of said wire guide rolls, in order to divide a single crystal into wafers in accordance with the first embodiment of the method. Accordingly, the predefinition curves were designed such that the reaction to a change in the length of the workpiece during the sawing operation comprised equidirectional changes in the length of the coating and of the fixed bearing of the wire guide rolls. The predefinition curves illustrated show the desired temperature T of the coolant as a function of the position POS of the feed table, which is equivalent to the temporal progression of the sawing operation. The square data points show the desired temperature of the coolant for cooling the wire guide rolls and the circular data points show the desired temperature of the coolant for cooling the fixed bearings of the wire guide rolls.

Figure 5:
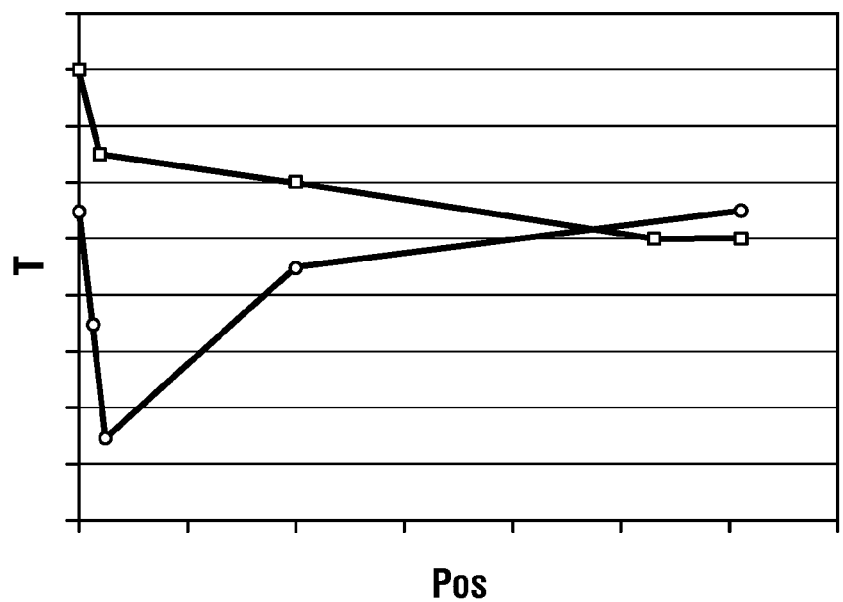
FIG. 5 shows predefinition curves that were used for cooling wire guide rolls and the fixed bearings thereof in a method in accordance with another embodiment.

FIG. 5 shows the predefinition curves that were used for cooling the wire guide rolls clamping the wire web and the fixed bearings of said wire guide rolls, in order to divide a single crystal into wafers in accordance with the second embodiment of the method. Accordingly, the predefinition curves were designed to achieve, during the sawing operation, as far as possible no changes in the length of the coating and of the fixed bearing of the respective wire guide roll. The square data points again show the desired temperature of the coolant for cooling the wire guide rolls and the circular data points show the desired temperature of the coolant for cooling the fixed bearings of the wire guide rolls.

The effect of cooling the wire guide rolls and of cooling the fixed bearings of the wire guide rolls in a manner independent of one another becomes apparent when expansion measurements of the coating and of the core of the wire guide roll are considered.

Figure 6:
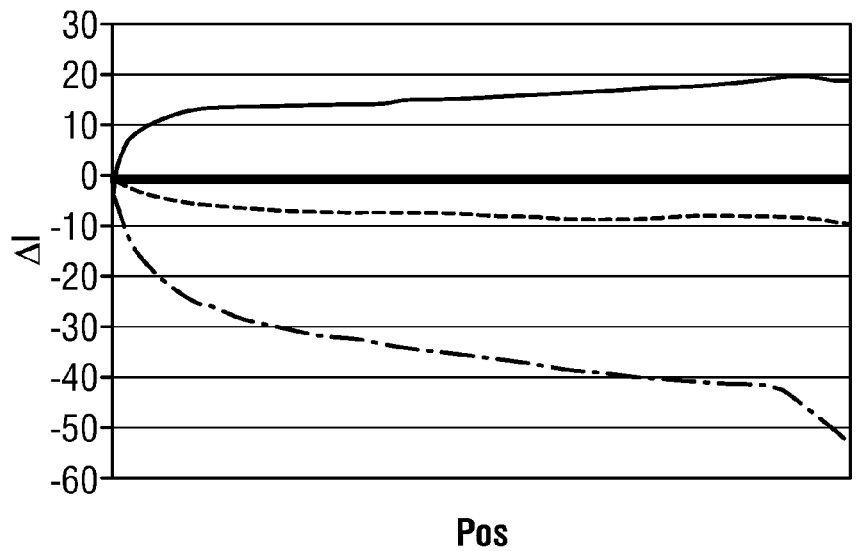
FIGS. 6 and 7 show the result of expansion measurements.

FIG. 6 illustrates the expansion $\Delta l$ of the coating of the wire guide roll on the fixed bearing side (solid line), of the coating of the wire guide roll on the movable bearing side (dash-dotted line) and of the core of the wire guide roll on the movable bearing side (dashed line) as a function of the position Pos of the feed table. FIG. 6 shows the measurement result of an experiment in which the cooling of the wire guide rolls and of the fixed bearings of the wire guide rolls in a manner independent of one another had been dispensed. Instead, a common cooling circuit had been set up for cooling a wire guide roll and its fixed bearing.

Figure 7:
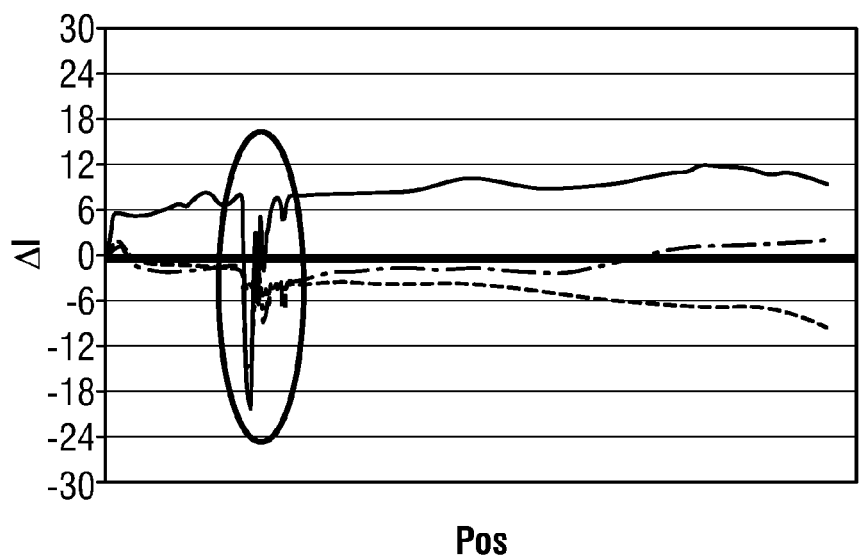

FIG. 7 illustrates the expansion $\Delta l$ of the coating of the wire guide roll on the fixed bearing side (solid line), of the coating of the wire guide roll on the movable bearing side (dash-dotted line) and of the core of the wire guide roll on the movable bearing side (dashed line) as a function of the position Pas of the feed table. FIG. 7 shows the measurement result of an experiment in which the cooling of the wire guide rolls and of the fixed bearings of the wire guide rolls was effected according to the invention, namely in a manner independent of one another. The elliptically delimited area merely indicates a disturbance during the measurement which is of no importance for the invention.

What is claimed is:

1. A method for slicing wafers from a workpiece, the method comprising:
   providing a workpiece;
   providing a wire guide roll having a grooved coating with a specific thickness;
   providing a fixed bearing respectively associated with the wire guide roll;
   providing a sawing wire including wire sections disposed in a parallel fashion on the wire guide roll;
   moving the wire sections of the sawing wire relative to the workpiece so as to perform a sawing operation;
   cooling the wire guide roll using a channel at least partially disposed inside the wire guide roll; and
   cooling the fixed bearing independently of the wire guide roll;
   measuring an axial change in a length of the grooved coating of the wire guide roll during the sawing operation so as to provide a measurement;
   generating a first and a second regulation signal based on the measurement; and
   regulating the cooling of the wire guide roll using the first regulation signal and regulating the cooling of the fixed bearing using the second regulation signal.

2. The method recited in claim 1, wherein the cooling the wire guide roll and the cooling the fixed bearing is carried out so as to maintain a difference $\Delta L_W(x)-(\Delta L_F+\Delta L_B(x))$ of less than 20 µm at every point in time during the sawing operation, wherein:
   $\Delta L_W(x)$ is an axial displacement of an axial position x on the workpiece due to a change in length of the workpiece as a result of a change in temperature of the workpiece,
   $\Delta L_F$ is a change in length of the fixed bearing as a result of a change in temperature of the fixed bearing, and
   $\Delta L_B(x)$ is an axial displacement of the axial position x on a coating of the wire guide roll due to a change in length of the coating as a result of a change in temperature of the coating.

3. The method recited in claim 2, further comprising reacting to an axial displacement $\Delta L_W(x)$ of greater than 0 µm by cooling the wire guide roll and the fixed bearing so as to realize the difference $\Delta L_W(x)-(\Delta L_F+\Delta L_B(x))$ that is less than 20 µm.

4. The method recited in claim 1, further comprising:
   providing a first predefinition curve that describes at least one of a temperature and a speed of a coolant for cooling the wire guide roll during the sawing operation;
   providing a second predefinition curve that describes at least one of a temperature and a speed of a coolant for cooling the fixed bearing during the sawing operation;
   cooling the wire guide roll in accordance with the first predefinition curve; and
   cooling the fixed bearing in accordance with the second predefinition curve.

5. The method recited in claim 4, wherein the first predefinition curve is a function of the thickness of the coating of the wire guide rolls.

6. The method recited in claim 2, further comprising cooling the workpiece so as to maintain $\Delta L_W(x)$ at less than 5 µm during the sawing operation, and wherein the cooling the wire guide roll and the cooling the fixed bearing is carried out so as to maintain a sum $(\Delta L_F+\Delta L_B(x))$ at less than 25 µm during the sawing operation.

7. The method recited in claim 1, further comprising clamping the coating onto an underlying core of the wire guide roll.

8. The method recited in claim 1, wherein the moving the wire sections of the saw wire relative to the workpiece is carried out in the presence of a sawing slurry.

* * * * *